United States Patent
Hamamoto

(10) Patent No.: US 6,897,916 B2
(45) Date of Patent: May 24, 2005

(54) POLARIZING PLATE, OPTICAL ELEMENT, AND LIQUID CRYSTAL DISPLAY

(75) Inventor: Eiji Hamamoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 225 days.

(21) Appl. No.: 09/951,146

(22) Filed: Sep. 11, 2001

(65) Prior Publication Data

US 2003/0067568 A1 Apr. 10, 2003

(51) Int. Cl.[7] ............................................. G02F 1/1335
(52) U.S. Cl. ......................................... 349/96; 430/321
(58) Field of Search ........................ 349/96; 428/1.31; 430/321

(56) References Cited

U.S. PATENT DOCUMENTS

| | | | | |
|---|---|---|---|---|
| 5,886,819 A | * | 3/1999 | Murata et al. | 359/483 |
| 6,113,811 A | * | 9/2000 | Kausch et al. | 252/585 |
| 6,337,369 B1 | * | 1/2002 | Isozaki | 525/61 |
| 6,395,863 B2 | * | 5/2002 | Geaghan | 528/196 |
| 6,512,562 B1 | * | 1/2003 | Kobayashi et al. | 349/122 |

FOREIGN PATENT DOCUMENTS

JP          10-138405          5/1998

* cited by examiner

Primary Examiner—Hoai Pham
Assistant Examiner—Wai-Sing Louie
(74) Attorney, Agent, or Firm—Westerman, Hattori, Daniels & Adrian, LLP

(57) ABSTRACT

A polyvinyl alcohol-based polarizing film is provided, and the polarizing film has excellent surface smoothness while the light transmittance and the polarization degree are improved due to the high stretch ratio. The polarizing film is obtained from a polyvinyl alcohol film having a thickness ranging from 85 $\mu$m to 150 $\mu$m by dyeing the film with a dichroic substance and stretching it to 4–7 times its original length. The polarizing film has a light transmittance ranging from 35% to 50% and a polarization degree of at least 80%, and the surface roughness in a direction perpendicular to the stretching axis is at most 0.04 $\mu$m based on a centerline average roughness. A transparent protective layer or a transparent protective plate comprising the transparent protective layer is formed on at least one surface of the polarizing film in order to provide a polarizing plate. The transparent protective layer can be subject to a pre-treatment selected from a hard-coat treatment and an anti-glare treatment. Additional optical layers are laminated on the polarizing plate in order to provide an optical element. A polarizing plate or an optical element comprising the above-mentioned polarizing film has an excellent light transmittance and polarization degree, so that stripe-shaped streaks inhibiting visibility will not be observed substantially even in a reflection mode.

24 Claims, No Drawings

POLARIZING PLATE, OPTICAL ELEMENT, AND LIQUID CRYSTAL DISPLAY

BACKGROUND OF THE INVENTION

1. Field of the Invention

The present invention relates to a highly stretched polarizing film having an excellent light transmittance, a polarization degree and surface smoothness. The present invention relates to also a polarizing plate and an optical element using the same.

2. Description of the Related Art

Polarizing films composed of stretched polyvinyl alcohol films are known in the art. As liquid crystal displays have become more common, further improvement in a light transmittance and a polarization degree has been sought. One suggestion for improving these features is to provide conventional polyvinyl alcohol films stretched at a higher ratio.

However, such a polarizing film has a problem that the high stretch ratio induces streaks like a groove on a record and that the streaks are recognized easily to inhibit the visibility in a reflection mode. The streaks look like stripes in the stretching axis direction and appear in general as irregularity having a centerline average roughness of at least 0.06 μm with average spacing in a range from 0.6 mm to 0.8 mm.

SUMMARY OF THE INVENTION

In one aspect, the present invention relates to a polyvinyl alcohol-based polarizing film having excellent surface smoothness developed for improving a light transmittance and a polarization degree provided by a high stretch ratio.

For this purpose, the present invention provides a polarizing plate comprising a polarizing film. The polarizing film is composed of a polyvinyl alcohol film having a thickness ranging from 85 μm to 150 μm, dyed with a dichroic substance and stretched to 4–7 times its original length, and it has a light transmittance ranging from 35% to 50% and a polarization degree of at least 80%; a surface roughness in a direction perpendicular to the stretching axis of at most 0.04 μm based on a centerline average roughness. Additionally, the polarizing film is provided with a transparent protective layer on at least one surface thereof, and the transparent protective layer is used as itself or it is subject to a pre-treatment selected from a hard-coat treatment and an anti-glare treatment.

In one preferred embodiment for the polarizing plate, the polyvinyl alcohol film has a thickness ranging from 90 μm to 130 μm.

In one preferred embodiment for the polarizing plate, the polyvinyl alcohol film is stretched to 5.5 to 6.5 times.

In one preferred embodiment for the polarizing plate, the polarizing film has a light transmittance ranging from 40% to 50% and a polarization degree of at least 90%, and the surface roughness in a direction perpendicular to the stretching axis is at most 0.03 μm based on the centerline average roughness. More preferably, the light transmittance range is from 42% to 50% and the polarization degree is at least 95%, and the surface roughness in a direction perpendicular to the stretching axis is at most 0.02 μm based on the centerline average roughness.

In one preferred embodiment for the polarizing plate, the transparent protective layer comprises a resin selected from the group consisting of a cellulose-based resin, a polycarbonate-based resin and a polyester-based resin, where the thickness range is from 1 μm to 300 μm.

A polarizing plate according to the present invention may be provided with either a reflective layer or a semitransparent reflective layer.

In one aspect, the present invention provides an optical element comprises a laminate of a polarizing plate and at least one optical layer selected from the group consisting of a retardation plate, a viewing angle compensating film, a photoconcentrating plate, a brightness-enhanced plate and a light diffusion plate. The polarizing plate comprising a polarizing film, and the polarizing film is composed of a polyvinyl alcohol film having a thickness ranging from 85 μm to 150 μm, dyed with a dichroic substance and stretched to 4–7 times its original length, and it has a light transmittance ranging from 35% to 50% and a polarization degree of at least 80%; a surface roughness in a direction perpendicular to the stretching axis of at most 0.04 μm based on a centerline average roughness. Additionally, the polarizing film is provided with a transparent protective layer on at least one surface thereof, and the transparent protective layer is used as itself or it is subject to a pre-treatment selected from a hard-coat treatment and an anti-glare treatment.

In one preferred embodiment for the optical element, the optical layer is either a retardation plate or a brightness-enhanced plate.

The retardation plate comprises at least one selected from the group consisting of a birefringent film of a plastic stretched film, an oriented film of a discotic or nematic liquid crystal polymer, and a sheet comprising a film substrate and an oriented layer of either discotic or nematic liquid crystal supported by the film substrate.

The brightness-enhanced plate comprises at least one selected from a laminate of thin films distinguished from each other in the refractive index anisotropy, an oriented film of a cholesteric liquid crystal polymer, and a sheet comprising a film substrate and an oriented layer of a cholesteric liquid crystal polymer supported by the film substrate.

In one preferred embodiment for the optical element, the polarizing plate and the optical layer are adhered integrally to each other through a pressure-sensitive adhesive layer.

In one preferred embodiment for the optical element, the polyvinyl alcohol film has a thickness ranging from 90 μm to 130 μm.

In one preferred embodiment for the optical element, the polyvinyl alcohol film is stretched to 5.5 to 6.5 times.

In one preferred embodiment for the optical element, the polarizing film has a light transmittance ranging from 40% to 50% and a polarization degree of at least 90%, and the surface roughness in a direction perpendicular to the stretching axis is at most 0.03 μm based on the centerline average roughness. More preferably, the light transmittance range is from 42% to 50% and the polarization degree is at least 95%, and the surface roughness in a direction perpendicular to the stretching axis is at most 0.02 μm based on the centerline average roughness.

In one preferred embodiment for the optical element, the transparent protective layer is composed of a cellulose-based resin, a polycarbonate-based resin or a polyester-based resin, and the thickness range is from 1 μm to 300 μm.

The present invention further provides a liquid crystal display comprising a liquid crystal cell and an optical element disposed on at least one surface of the liquid crystal cell. The optical element is provided by laminating on the above-mentioned polarizing plate at least one optical layer selected from the group consisting of a retardation plate, a viewing angle compensating film, a photoconcentrating plate, a brightness-enhanced plate and a light diffusion plate.

According to the present invention, a polyvinyl alcohol film with excellent surface smoothness can be manufactured even if the film is stretched at a high stretch ratio ranging from 4 to 7 times, and the thus obtained polarizing film has an excellent light transmittance and a polarization degree, in which stripe-shaped streaks are merely recognized even in a reflection mode, so that the visibility will not be inhibited. The polarizing film is used for a polarizing plate or an optical element.

The above-mentioned surface roughness is defined in JIS B 0601-1994.

DETAILED DESCRIPTION OF THE INVENTION

A polarizing film according to the present invention is composed of a polyvinyl alcohol film having a thickness ranging from 85 μm to 150 μm. The film is dyed with a dichroic substance and stretched to 4–7 times its original length. The film has a light transmittance ranging from 35% to 50% and a polarization degree of at least 80%, and the surface roughness in a direction perpendicular to the stretching axis is at most 0.04 μm based on the centerline average roughness.

The polyvinyl alcohol film used for the polarizing film has a thickness ranging from 85 μm to 150 μm and it is stretched to 4–7 times. Excepting this point, the polarizing film can be formed by any of proper conventional techniques. For example, a dichroic substance such as a dichroic dye and/or iodine is absorbed in a polyvinyl alcohol film before uniaxial stretching.

According to the present invention, a polyvinyl alcohol film having a thickness ranging from 85 μm to 150 μm is stretched to 4–7 times, or preferably, 5.5–6.5 times so that the thus obtained polarizing film can have excellent surface smoothness and provide a high light transmittance ranging from 35% to 50% and a high polarization degree of at least 80% provided by the high stretch ratio. When the thickness of the polyvinyl alcohol film is less than 85 μm, stripe-shaped streaks like a groove on a record are generated in the stretching axis direction as a result of a treatment at the high stretch ratio to provide the high light transmittance and polarization degree. The streaks form surface irregularity in a direction perpendicular to the stretching axis, which will be recognized easily in a reflection mode and inhibits visibility. Moreover, the film will tend to be torn or broken during such a stretching treatment, and this will lower the yield. For a polyvinyl alcohol film having a thickness of more than 150 μm, crystallization in the film surface varies considerably. As a result, orientation or dyeing with a dichroic substance for achieving a high polarization degree requires a long time and this degrades the production efficiency considerably. In addition, irregularities in orientation and dyeing easily occur to increase variation in the quality.

A polarizing film according to the present invention not only provides the above-mentioned light transmittance and polarization degree but prevents visibility inhibition caused by the streaks, since the surface roughness in a direction perpendicular to the stretching axis is determined to be at most 0.04 μm based on the centerline average roughness. From an aspect of providing surface smoothness to prevent such visibility inhibition, a preferable polyvinyl alcohol film has a thickness of 140 μm or less, preferably the thickness range is from 90 μm to 130 μm, most preferably, from 95 μm to 120 μm. A polymerization degree of the polyvinyl alcohol film ranges from 1500 to 6000, or preferably, from 2000 to 5000.

From an aspect of optical performance or the like, a preferable polarizing film has a light transmittance ranging from 38% to 50%, preferably from 40% to 50%, and most preferably, from 42% to 50%. The polarization degree is at least 85%, preferably, at least 90%, and most preferably, at least 95%. The surface roughness in a direction perpendicular to the stretching axis is determined not more than 0.035 μm based on a centerline average roughness, preferably not more than 0.030 μm, most preferably, not more than 0.02 μm. The average spacing between irregularities/streaks in a direction perpendicular to the stretching axis based on a centerline average roughness ranges from 0.4 mm to 0.8 mm in general.

A transparent protective layer can be provided to at least one surface of the polarizing film according to the present invention, if required. Functions of the transparent protective layer include protection of the surface of the polarizing film. Preferably, such a transparent protective layer is made of polymers or glass having excellent properties such as transparency, mechanical strength, thermal stability and waterproof.

Examples of the polymers include a cellulose-based resin such as triacetylcellulose, a polycarbonate-based resin, a polyester-based resin, a polyethersulfone-resin, a polyamide-based resin, a polyimide-based resin, a polyolefin-based resin, an acrylic resin, and thermosetting/ultraviolet-curable resins based on acrylic, urethane, acrylic urethane, epoxy, silicone or the like. Among them, a cellulose-based resin, a polycarbonate-based resin, and a polyester-based resin are most preferable from an aspect of the transparency and the protective function.

Such a transparent protective layer may be formed by a suitable method, for example, by laminating a polymer film or a glass sheet through an adhesive or a pressure-sensitive adhesive, or by coating with a polymer solution. Though there is no specific limitation on the thickness of the transparent protective layer, it is in general 500 μm or less, preferably in a range from 1 μm to 300 μm, most preferably, from 5 μm to 200 μm. When transparent protective films are provided onto both surfaces of a polarizing plate, the resin compositions of the layers can be differed from each other.

The transparent protective layer can be subject to a hard-coat treatment, an anti-glare treatment or the like. The hard-coat treatment is performed for, e.g., preventing scratches on the surface of the polarizing plate. Such a hard coat can be provided in a conventional manner. For example, a hard coat having excellent hardness and smoothness is made of an ultraviolet-curable resin such as a silicone-based resin, and the coating of the resin is applied to the surface of the transparent protective layer.

Generally, when outdoor daylight is reflected on a surface of a polarizing plate, the light will inhibit visibility of light passing through the polarizing plate. The anti-glare treatment is performed to suppress glare, and the treatment includes formation of fine irregularity on a surface of a transparent protective layer by a proper method, such as roughening like sandblasting and embossing. Alternatively, transparent fine particles can be blended.

The transparent fine particles having an average particle diameter ranging from 0.5 $\mu$m to 20 $\mu$m are selected from conductive/nonconductive inorganic fine particles such as silica, alumina, titania, zirconia, stannic oxide, indium oxide, cadmium oxide or antimony oxide, and organic fine particles such as crosslinked/uncrosslinked polymers. The amount of the fine particles is in a range from 2 weight parts to 50 weight parts for 100 weight parts of a transparent resin, an in general, it is in a range from 5 weight part to 25 weight part.

An anti-glare layer containing the above-mentioned transparent fine particles can be provided as a transparent protective layer or as a coating on a surface of another transparent protective layer. The anti-glare layer can function as a diffusion layer to diffuse light passing through the polarizing plate and to compensate the viewing angle.

There is no specific imitation on a method to adhere the polarizing film and the transparent protective layer. Examples of the adhesives include an adhesive comprising a vinyl alcohol-based polymer. Furthermore, the adhesive can contain at least a water-soluble crosslinking agent for the vinyl alcohol, i.e., boric acid, borax, glutaraldehyde, melamine, oxalic acid or the like. Such an adhesive layer can be provided by coating an aqueous solution and drying it, and the solution can contain other additives and catalysts such as an acid if required. An adhesive comprising polyvinyl alcohol is especially preferred since the adhesive has the best adherence with a polyvinyl alcohol film. There is no specific limitation on a thickness of the adhesive layer, but a preferable range is from 0.02 $\mu$m to 0.15 $\mu$m for achieving the purpose of the present invention.

A polarizing plate according to the present invention may be provided with a reflective layer or a semitransparent reflective layer for use. A reflection type polarizing plate having a reflective layer is used for a liquid crystal display that reflects incident light from the visible side (display side) for displaying. A liquid crystal display provided with the reflection type polarizing plate can be made thin, since an internal light source such as a backlight can be omitted. A semitransparent polarizing plate having a semitransparent reflective layer may be used for a liquid crystal display that uses a light source such as a backlight for displaying in a dark place while serving as a reflection type display when outdoor daylight is available.

A reflection type polarizing plate may be formed by any suitable methods. For example, a reflective layer is formed by providing a foil or an evaporation film of a reflective metal such as aluminum on a transparent protective layer composing the polarizing plate. Alternatively, a reflective plate comprising such a reflective layer on a transparent substrate can be bonded to either a polarizing film or to a transparent protective layer formed on the polarizing film. A semitransparent polarizing plate can be formed properly. For example, the above-mentioned reflective layer or the reflective plate can be made as a half mirror, or an additive such as a pearl pigment can be added to produce a semitransparent reflective plate that will reflect and pass light.

A reflective layer or a semitransparent reflective layer can have a function of diffusing light. Such a layer corresponds with a finely irregular surface of the transparent resin layer. Preferably, the reflective layer is used with the reflective surface being covered with a transparent substrate or the like, since degradation of reflection rate caused by oxidation can be prevented and thus, the initial reflection rate can be maintained for a long period of time.

A reflective polarizing plate having a light diffusion function can diffuse incident light so as to prevent orientation or glare and suppress contrast in brightness. A semitransparent polarizing plate having a light diffusion function can suppress brightness contrast further since incident light and the reflected light are diffused while passing through the polarizing plate.

Such a reflective layer of a finely irregular structure can be provided by applying a metal directly to the surface of a transparent resin layer by any of suitable methods such as deposition and plating, i.e., vacuum deposition, ion plating and sputtering. A reflective plate or a semitransparent reflective plate can be adhered to a polarizing plate through an adhesive layer or a pressure-sensitive adhesive layer if required.

A polarizing plate according to the present invention can be laminated with an optical layer having a separate optical function so as to provide an optical element. The optical layer can be selected properly from components of a liquid crystal display, such as a retardation plate, a viewing angle compensating film, a photoconcentrating plate, a brightness-enhanced plate and a light diffusion plate.

A retardation plate as the optical layer may be used for various purposes such as compensation of phase difference caused by a liquid crystal cell. The retardation plate can be made of a birefringent film comprising a stretched film of various plastics, an oriented film of a discotic/nematic liquid crystal polymer, or a sheet of a layer of the oriented liquid crystal supported by a film substrate. Preferable film substrates for supporting oriented liquid crystal layers include a cellulose-based film having excellent isotropy.

Plastics for forming the above-mentioned birefringent film can be selected properly, for example, from polycarbonate, polyvinyl alcohol, polystyrene, polymethyl methacrylate, polypropylene and some other polyolefins, polyalylate and polyamide.

A film can be stretched uniaxially or biaxially. Alternatively, a stretched film can be a birefringent film having a controlled refractive index in the film thickness direction by adhering a thermal shrinkable film so as to provide shrinkage force and/or stretching force. Two or more retardation plates can be used together for controlling optical properties like phase difference.

A viewing angle compensating film is used for compensating viewing angle of a liquid crystal display or the like. Such a film can be formed as a supporting film for a discotic liquid crystal layer (an example of products is 'WV film' of Fuji Photo Film Co., Ltd.).

A photoconcentrating plate used for e.g., control of light path can be provided as a prism array sheet, a lens array sheet, or a dot-attachment sheet.

A brightness-enhanced plate is used for enhancing brightness in a liquid crystal display. Examples of the brightness-enhanced plates include a prism array sheet, a lens array sheet, a reflection type polarizing separation sheet, and a polarizing separation sheet. The above-mentioned reflection type polarizing separation sheet is manufactured by laminating thin films having different refractive index anisotropy so that it will have anisotropy in the reflection rate by the interference. The polarizing separation sheet is manufactured by forming on a film substrate an oriented film of a cholesteric liquid crystal polymer or the oriented liquid crystal layer.

A reflection type polarizing sheet can be selected properly as long as it reflects linear polarized light in a predetermined polarization direction or circularly polarized light in a predetermined direction while passing the remaining light when natural light enters. Examples of the reflection type polarizing sheets are linear polarizing separation sheets and circular polarizing separation sheets. The linear polarizing separation sheets pass linear polarized light in a predetermined polarization direction while reflect the remaining light, and the sheets include a dielectric multilayer thin film or a laminate of thin films different from each other in the refractive index anisotropy The circular polarizing separation sheets reflect right or left circular polarized light while passing the remaining light, and the sheets include a cholesteric liquid crystal layer, an oriented film of a cholesteric liquid crystal layer, or a sheet comprising a film substrate and an oriented liquid crystal layer of a cholesteric liquid crystal polymer supported by the film substrate.

A light diffusion plate can be a sheet corresponding to the above-mentioned transparent protective layer having a finely irregular surface.

An optical element can be provided as a laminate comprising two or at least three layers by combining properly one or at least two layers of any suitable optical layers such as the above-mentioned retardation plate together with a polarizing film or a polarizing plate. In this case, two or more optical layers like the retardation plates can be arranged respectively. The optical layers can be arranged properly depending on the use without any specific limitations.

The above-mentioned reflective layers and optical layers are adhered to a polarizing plate integrally through an adhesive layer if required. There is no specific limitation on the adhesive used for the adhesive layer. A pressure-sensitive adhesive layer is preferred from an aspect of convenience in adhesion and prevention of optical strains by relaxing internal stress caused by temperature difference.

The pressure-sensitive adhesive layers can comprise a sticky substance or a pressure-sensitive adhesive based on a polymer such as an acrylic polymer, a silicone-based polymer, polyester, polyurethane, polyether or a synthetic rubber, without any specific limitations. Among them, an acrylic pressure-sensitive adhesive can be used preferably since it has appropriate properties such as wettability, cohesiveness, and adhesiveness and excellent weather resistance and thermal resistance so that it causes substantially no problems such as lifting and peeling even when heat and/or moisture is applied.

There is no limitation on the acrylic pressure-sensitive adhesives, though an example is based on an acrylic polymer having a weight-average molecular weight of at least 100000. This is provided by copolymerization of methacrylic acid alkyl ester having an alkyl group of at most 20 carbons, e.g., a methyl group, an ethyl group and a butyl group together with an acrylic monomer comprising an improved substance of (meth)acrylic acid or hydroxy ethyl (meth)acrylate. Glass transition temperature for the copolymerization is not more than a room temperature, or preferably not more than 0° C.

For integration, a pressure-sensitive adhesive layer can be provided to at least one surface of a polarizing film, a polarizing plate or an optical layer. The pressure-sensitive adhesive layer can be a laminate of various materials. When pressure-sensitive adhesive layers are provided onto both surfaces, compositions of the layers can be differed from each other.

The pressure-sensitive adhesive layers can be provided to a polarizing film/plate or to an optical layer by a proper method. For example, a solution comprising a pressure-sensitive adhesive of about 10–40 weight % is prepared by dissolving or dispersing a sticky substance or the composition in a solvent comprising a proper materials such as toluene, ethyl acetate or a mixture thereof. The solution is provided directly onto a polarizing plate or an optical layer by any proper methods such as casting or coating. Otherwise, a pressure-sensitive adhesive layer can be formed on a separator by the above-mentioned way before being transplanted onto a polarizing film/plate or an optical layer.

A thickness of the pressure-sensitive adhesive layer can be determined properly depending on the adhesive force or the like, and in general it ranges from 1 $\mu$m to 500 $\mu$m. Such a pressure-sensitive adhesive layer can be provided to an outer surface of a polarizing plate or an optical element if required for adhesion to a liquid crystal cell or the like. When such a pressure-sensitive adhesive layer is exposed to the surface, preferably it is covered for protection with a separator or the like by the time of use.

Additives can be included in the pressure-sensitive adhesive layer if required. The additives include natural or synthetic resins, especially sticky resins; a filler such as glass fibers, glass beads, metal powder, or any other inorganic powders; a pigment; a coloring agent; and an antioxidant. The pressure-sensitive adhesive layer can contain fine particles to provide light diffusion property.

Ultraviolet absorbency can be provided to an optical layer such as a polarizing film, a transparent protective layer and a retardation plate and also an adhesive layer such as a pressure-sensitive adhesive layer used for composing a polarizing plate or an optical element if required. Ultraviolet absorbers used for the treatment will be selected from compounds based on, for example, salicylate ester, benzophenol benzotriazole, cyanoacrylate and nickel complex salt.

Polarizing films/plates according to the present invention and optical elements using the same can be used preferably for various liquid crystal displays including transparent type, reflective or transparent-reflective liquid crystal displays. The polarizing films/plates and optical elements can be disposed on one or both surfaces of liquid crystal cells. Polarizing films/plates and optical elements provided on both surfaces of cells can be the same or differ from each other.

Various types of liquid crystal cells can be used optionally for forming liquid crystal displays. The liquid crystal cells can be selected from, for example, an active matrix driving type such as a thin film transistor, and a simple matrix driving type such as a twist nematic type and a super twist nematic type.

EXAMPLE 1

A polyvinyl alcohol film having a thickness of 100 μm (VF-9X100RS produced by KURARAY CO., LTD., having a polymerization degree of 2400) was swelled for two minutes in 20° C. water before being dyed by dipping in a dye bath (30° C.) containing iodine for two minutes. Then the film was uniaxially stretched to 5.5 times in an acidic solution (50° C.) containing boric acid, and dried at 50° C. for seven minutes so that a polarizing film was obtained. Triacetylcellulose films 80 μm in thickness were bonded to both surfaces of the polarizing film through a polyvinyl alcohol-based adhesive layer, so that a polarizing plate was obtained.

EXAMPLE 2

A polarizing film and a polarizing plate were obtained by the method described in Example 1, except that the polyvinyl alcohol film was swelled in 30° C. water for two minutes, and dyed for one minute in a dye bath (30° C.) containing iodine and potassium iodide and then, uniaxially stretched to 5.5 times in an acidic solution (55° C.) containing boric acid.

EXAMPLE 3

A polarizing film and a polarizing plate were obtained by the method described in Example 1, except that the polyvinyl alcohol film was swelled in 30° C. water for two minutes, and dyed for one minute in a dye bath (40° C.) containing iodine and potassium iodide and then, uniaxially stretched to 5.5 times in an acidic solution (50° C.) containing boric acid.

EXAMPLE 4

A polarizing film and a polarizing plate were obtained by the method described in Example 1, except that the polyvinyl alcohol film was swelled in 30° C. water for two minutes, and dyed for one minute in a dye bath (40° C.) containing iodine and potassium iodide and then, uniaxially stretched to 6 times in an acidic solution (50° C.) containing boric acid.

EXAMPLE 5

A polarizing film and a polarizing plate were obtained by the method described in Example 1, except that the polyvinyl alcohol film was swelled in 30° C. water for two minutes, and dyed for one minute in a dye bath (30° C.) containing iodine and potassium iodide and then, uniaxially stretched to 6 times in an acidic solution (55° C.) containing boric acid.

EXAMPLE 6

A polarizing film and a polarizing plate were obtained by the method described in Example 1, except that the polyvinyl alcohol film was swelled in 20° C. water for two minutes, and dyed for one minute in a dye bath (30° C.) containing iodine and potassium iodide and then, uniaxially stretched to 6.5 times in an acidic solution (60° C.) containing boric acid.

COMPARATIVE EXAMPLE 1

A polarizing film and a polarizing plate were obtained by the method described in Example 1, except that a polyvinyl alcohol film 75 μm in thickness (VF-9X75RS produced by KURARAY CO., LTD., having a polymerization degree of 2400) was used.

COMPARATIVE EXAMPLE 2

A polarizing film and a polarizing plate were obtained by the method described in Example 2, except that a polyvinyl alcohol film 75 μm in thickness (VF-9P75RS produced by KURARAY CO., LTD., having a polymerization degree of 2400) was used.

COMPARATIVE EXAMPLE 3

A polarizing film and a polarizing plate were obtained by the method described in Example 3, except that VF-9X75RS was used.

COMPARATIVE EXAMPLE 4

A polarizing film and a polarizing plate were obtained by the method described in Example 4, except that a polyvinyl alcohol film 75 μm in thickness (VF-9P75R produced by KURARAY CO., LTD., having a polymerization degree of 1700) was used.

COMPARATIVE EXAMPLE 5

A polarizing film and a polarizing plate were obtained by the method described in Example 5, except that a polyvinyl alcohol film 75 μm in thickness (VF-9P75RH produced by KURARAY CO., LTD., having a polymerization degree of 4000) was used.

COMPARATIVE EXAMPLE 6

A polarizing film and a polarizing plate were obtained by the method described in Example 6, except that VF-9P75RS was used.

Evaluation Test (1) Streaks, Centerline Average Roughness (Ra), and Streak Mean Spacing (Sm)

Streaks were checked visually for polarizing films obtained in Examples and Comparative Examples. An instrument for measuring surface roughness shape (SURFCOM 470A produced by TOKYO SEIMITSU CO., LTD.) was used for measuring centerline average roughness (Ra) in a direction perpendicular to the stretching axis and also mean spacing (Sm) of irregularities forming the streaks.

(2) Light Transmittance and Polarization Degree

A light transmittance and a polarization degree were calculated in the following manner for the polarizing films obtained in Examples and Comparative Examples.

Transmittance is a Y value measured by means of a spectrophotometer (DOT-3 produced by MURAKAMI COLOR RESEARCH LABATORY) and corrected in the luminosity by means of 2-degree visual field of JIS Z 8701 (C light source).

A polarizing degree is obtained by calculating a measurement result of transmittance ($H_0$ and $H_{90}$) in accordance with the method for measuring transmittance, and by using the following equation. $H_0$ denotes a transmittance obtained by laminating two polarizing films so that the polarizing axes become parallel, while $H_{90}$ denotes a transmittance obtained by laminating two polarizing films so that the polarizing axes become perpendicular to each other. The parallel transmittance ($H_0$) and the perpendicular transmittance ($H_{90}$) are Y values corrected in the luminosity.

$$\text{Polarization Degree (\%)} = \sqrt{\frac{H_0 - H_{90}}{H_0 + H_{90}}} \times 100$$

(3) Visibility of Streaks

Polarizing plates obtained in Examples and Comparative Examples were observed visually for checking streaks. The results are as follows.

The table indicates that streaks like a record groove in the absorption axis direction (stripes) were observed in all Comparative Examples using a polyvinyl alcohol film having a thickness of 75 μm, and that the streaks were observed visually even through the transparent protective layers. However, substantially no streaks were generated in any Examples in which polyvinyl alcohol films having a thickness of 100 μm, and no streaks are observed visually through the transparent protective layers.

EXAMPLE 7

An optical element was manufactured by adhering a retardation plate through an acrylic pressure-sensitive adhesive layer to a polarizing plate obtained in Example 1. This optical element was adhered to one surface of a STN type liquid crystal cell (upper substrate: visible side) so that the retardation plate would face the substrate of the liquid crystal cell. Another polarizing plate obtained in Example 1 was adhered alone to the opposite side of the cell (lower substrate: backlight side) in order to manufacture a liquid crystal display.

COMPARATIVE EXAMPLE 7

An optical element and a liquid crystal display were manufactured in the method described in Example 7, except that the polarizing plate obtained in Comparative Example 1 was used.

Streaks were checked visually in a reflection mode for the liquid crystal displays obtained in Example 7 and Comparative Example 7, and the surface roughness was measured by using an instrument for measuring surface roughness shape.

TABLE 1

| | | | | Polarizing film | | Polarizing |
|---|---|---|---|---|---|---|
| | Streaks | Ra (μm) | Sm (mm) | Light transmittance (%) | Polarization Degree (%) | plate Streaks |
| Example 1 | No | 0.01 or less | Unmeasurable | 43.7 | 99.95 | No |
| Example 2 | No | 0.01 or less | Unmeasurable | 43.8 | 99.94 | No |
| Example 3 | No | 0.01 or less | Unmeasurable | 43.5 | 99.99 | No |
| Example 4 | No | 0.01 or less | Unmeasurable | 43.8 | 99.96 | No |
| Example 5 | No | 0.01 or less | Unmeasurable | 43.9 | 99.95 | No |
| Example 6 | No | 0.01 or less | Unmeasurable | 44.2 | 99.96 | No |
| Com. Ex. 1 | Yes | 0.06 | 0.75 | 43.5 | 99.99 | Yes |
| Com. Ex. 2 | Yes | 0.06 | 0.74 | 43.7 | 99.96 | Yes |
| Com. Ex. 3 | Yes | 0.08 | 0.81 | 43.7 | 99.95 | Yes |
| Com. Ex. 4 | Yes | 0.08 | 0.62 | 43.8 | 99.96 | Yes |
| Com. Ex. 5 | Yes | 0.09 | 0.68 | 44.0 | 99.95 | Yes |
| Com. Ex. 6 | Yes | 0.09 | 0.67 | 44.3 | 99.97 | Yes |

* Com. Ex.: Comparative Example

The results are shown in Table 2.

TABLE 2

| | Streaks | Ra (μm) | Sm (mm) | Light transmittance (%) | Polairization degree (%) |
|---|---|---|---|---|---|
| Example 7 | No | 0.01 or less | Unmeasurable | — | — |
| Com. Ex. 7 | Yes | 0.06 | 0.75 | — | — |

EXAMPLE 8

An optical element was manufactured by adhering a brightness-enhanced film (DBEF produced by 3M Limited) through an acrylic pressure-sensitive adhesive to a polarizing plate obtained in Example 1. This optical element was adhered to one surface (the lower substrate: backlight side) of a TFT type liquid crystal cell so that the DBEF would face outwards (backlight side), while another polarizing plate obtained in Example 1 was adhered alone to the opposite side of the cell (upper side: visible side) in a state that the absorption axes would cross at a right angle, so that a liquid crystal display was manufactured.

COMPARATIVE EXAMPLE 8

An optical element and a liquid crystal display were manufactured in the method described in Example 8, except that the polarizing plate obtained in Comparative Example 1 was used.

Streaks were checked visually in a reflection mode for the liquid crystal displays obtained in Example 8 and Comparative Example 8, and the surface roughness was measured by using an instrument for measuring surface roughness shape. The results are shown in Table 3.

TABLE 3

| | Steaks | Ra (μm) | Sm (mm) | Light transmittance (%) | Polarization degree (%) |
|---|---|---|---|---|---|
| Example 8 | No | 0.01 or less | Unmeasurable | — | — |
| Com. Ex. 8 | Yes | 0.06 | 0.75 | — | — |

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A polarizing plate comprising a polarizing film,
   wherein the polarizing film is composed of a polyvinyl alcohol film having a thickness ranging from 85 μm to 150 μm, dyed with a dichroic substance and stretched to 4–7 times,
   the polarizing film has a light transmittance ranging from 35% to 50% and a polarization degree of at least 80%; a surface roughness in a direction perpendicular to the stretching axis of at most 0.04 μm based on a centerline average roughness; and
   the polarizing plate further comprises a transparent protective layer disposed on at least one surface of the polarizing film.

2. The polarizing plate according to claim 1, wherein the transparent protective layer is subject to a pre-treatment selected from the group consisting of a hard-coat treatment and an anti-glare treatment.

3. The polarizing plate according to claim 1, wherein the polyvinyl alcohol film has a thickness ranging from 90 μm to 130 μm.

4. The polarizing plate according to claim 1, wherein the polyvinyl alcohol film is stretched to 5.5–6.5 times.

5. The polarizing plate according to claim 1, wherein the polarizing film has a light transmittance ranging from 40% to 50% and a polarizing degree of at least 90%, and the surface roughness in a direction perpendicular to a stretching axis is at most 0.03 μm based on the centerline average roughness.

6. The polarizing plate according to claim 1, wherein the polarizing film has a light transmittance ranging from 42% to 50% and a polarizing degree of at least 95%, and the surface roughness in a direction perpendicular to a stretching axis is at most 0.02 μm based on the centerline average roughness.

7. The polarizing plate according to claim 1, wherein the transparent protective layer comprises at least one material selected from the group consisting of a cellulose-based resin, a polycarbonate-based resin, and a polyester-based resin.

8. The polarizing plate according to claim 7, wherein the transparent protective layer has a thickness ranging from 1 μm to 300 μm.

9. The polarizing plate according to claim 1, further comprising a reflective layer or a semitransparent reflective layer.

10. An optical element comprising a laminate of a polarizing plate and at least one optical layer selected from the group consisting of a retardation plate, a viewing angle compensating film, a photoconcentrating plate, a brightness enhancement plate and a light diffusion plate,
    wherein the polarizing plate comprises a polarizing film,
    the polarizing film comprises a polyvinyl alcohol film having a thickness ranging from 85 μm to 150 μm, dyed with a dichroic substance and stretched to 4–7 times,
    the polarizing film has a light transmittance ranging from 35% to 50% and a polarization degree of at least 80%; a surface roughness in a direction perpendicular to the stretching axis of at most 0.04 μm based on a centerline average roughness, and the polarizing plate further comprises a transparent protective layer disposed on at least one surface of the polarizing film.

11. The optical element according to claim 10, wherein the transparent protective layer is subject to a pre-treatment selected from the group of a hard-coat treatment and an anti-glare treatment.

12. The optical element according to claim 10, wherein the optical layer comprises at least one material selected from the group consisting of a retardation plate and a brightness enhanced plate.

13. The optical element according to claim 12, wherein the retardation plate comprises at least one material selected from the group consisting of a bireflingent film comprising a plastic stretched film, an oriented film of either a discotic or nematic liquid crystal polymer, and a sheet comprising a film substrate and an oriented liquid crystal layer of a discotic or nematic liquid crystal supported by the film substrate.

14. The optical element according to claim 12, wherein the brightness-enhanced plate comprises at least one material selected from the group consisting of a laminate of thin films distinguished from each other in the refractive index anisotropy, an oriented film of a cholesteric liquid crystal polymer, and a sheet comprising a film substrate and an oriented liquid crystal layer of a cholesteric liquid crystal polymer supported by the film substrate.

15. The optical element according to claim 10, wherein the polarizing plate and the optical layer are adhered integrally with each other through a pressure-sensitive adhesive layer.

16. The optical element according to claim 10, wherein the polyvinyl alcohol film has a thickness ranging from 90 $\mu$m to 130 $\mu$m.

17. The optical element according to claim 10, wherein the polyvinyl alcohol film is stretched to 5.5–6.5 times.

18. The optical element according to claim 10, wherein the polarizing film has a light transmittance ranging from 40% to 50% and a polarizing degree of at least 90%, and the surface roughness in a direction perpendicular to a stretching axis is at most 0.03 $\mu$m based on the centerline average roughness.

19. The optical element according to claim 10, wherein the polarizing film has a light transmittance ranging from 42% to 50% and a polarizing degree of at least 95%, and the surface roughness in a direction perpendicular to a stretching axis is at most 0.02 $\mu$m based on the centerline average roughness.

20. The optical element according to claim 10, wherein the transparent protective layer comprises at least one material selected from the group consisting of a cellulose-based resin, a polycarbonate-based resin, and a polyester-based resin.

21. The optical element according to claim 20, wherein the transparent protective layer has a thickness ranging from 1 $\mu$m to 300 $\mu$m.

22. A liquid crystal display comprising a liquid crystal cell and an optical element disposed on at least one surface of the liquid crystal cell,
wherein the optical element comprises a laminate of a polarizing plate and at least one optical layer selected from the group consisting of a retardation plate, a viewing angle compensating film, a photoconcentrating plate, a brightness enhancement plate and a light diffusion plate,
wherein the polarizing plate comprises a polarizing film,
the polarizing film comprises a polyvinyl alcohol film having a thickness ranging from 85 $\mu$m to 150 $\mu$m, dyed with a dichroic substance and stretched to 4–7 times,
the polarizing film has a light transmittance ranging from 35% to 50% and a polarization degree of at least 80%; a surface roughness in a direction perpendicular to the stretching axis of at most 0.04 $\mu$m based on a centerline average roughness, and
the polarizing plate further comprises a transparent protective layer disposed on at least one surface of the polarizing film.

23. The optical element according to claim 10, wherein the polarizing film is composed of the polyvinyl alcohol film.

24. The liquid crystal display according to claim 22, wherein the polarizing film iscomposed of the polyvinyl alcohol film.

* * * * *